(12) United States Patent  
Stockinger

(10) Patent No.: US 8,730,625 B2  
(45) Date of Patent: May 20, 2014

(54) ELECTROSTATIC DISCHARGE PROTECTION CIRCUIT FOR AN INTEGRATED CIRCUIT

(75) Inventor: Michael A. Stockinger, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 88 days.

(21) Appl. No.: 13/239,640

(22) Filed: Sep. 22, 2011

(65) Prior Publication Data

US 2013/0077195 A1 Mar. 28, 2013

(51) Int. Cl.  
*H02H 9/04* (2006.01)

(52) U.S. Cl.  
USPC .......................................... 361/56

(58) Field of Classification Search  
USPC .......................................... 361/56  
See application file for complete search history.

(56) References Cited

U.S. PATENT DOCUMENTS

| | | | |
|---|---|---|---|
| 5,946,177 A | 8/1999 | Miller et al. | |
| 6,724,603 B2 | 4/2004 | Miller et al. | |
| 7,027,275 B2 | 4/2006 | Smith | |
| 7,209,332 B2 | 4/2007 | Stockinger et al. | |
| 7,440,248 B2 | 10/2008 | Arai et al. | |
| 7,706,113 B1 | 4/2010 | Lien et al. | |
| 2004/0109271 A1* | 6/2004 | Takeda | 361/56 |
| 2005/0078419 A1* | 4/2005 | Stockinger et al. | 361/56 |

FOREIGN PATENT DOCUMENTS

WO 2005039011 A1 4/2005

OTHER PUBLICATIONS

Stockinger, et al., "CDM Protection Design for CMOS Applications Using RC-Triggered Rail Clamps", EOS/ESD Symposium, 2009, pp. 2A.5-1-2A.5-10.  
Li, et al., "Design and Characterization of a Multi-RC-triggered MOFSET-based Power Claimp for On-chip ESD Protection", EOS/ESD Symposium, 2006, pp. 4A.3-1-4A.3-7.  
Li, et al., "A Compact, Timed-shutoff, MOSFET-based Power Clamp for On-chip ESD Protection," ESD Symposium, 2004, 7 pgs.

* cited by examiner

*Primary Examiner* — Jared Fureman  
*Assistant Examiner* — Kevin J Comber  
(74) *Attorney, Agent, or Firm* — Daniel D. Hill

(57) ABSTRACT

An electrostatic discharge (ESD) protection circuit includes a clamping transistor and a trigger circuit. The clamping transistor is coupled between a first power supply voltage terminal and a second power supply voltage terminal. The trigger circuit includes a detection circuit, first and second transistors, and first, second, and third inverters. The detection circuit is coupled to monitor a power supply voltage. The first inverter has an input terminal coupled to a current electrode of the first transistor, and an output terminal coupled to a control electrode of the clamping transistor. The second inverter and the third inverter form a feedback path from the output of the first inverter to the control electrode of the first transistor. The second inverter has a switching voltage that is lower than a midpoint voltage of a power supply voltage provided to the first and second power supply voltage terminals.

20 Claims, 4 Drawing Sheets

ELECTROSTATIC DISCHARGE PROTECTION CIRCUIT FOR AN INTEGRATED CIRCUIT

BACKGROUND

1. Field

This disclosure relates generally to semiconductors, and more specifically, to an integrated circuit having an electrostatic discharge (ESD) protection circuit.

2. Related Art

An integrated circuit (IC) may be subject to an electrostatic discharge (ESD) event that can damage the IC. Electrostatic discharge protection circuits include transistor clamps that are turned on in response to a fast rising transient voltage on an IC pin. The clamps are used to shunt ESD current between the power supply voltage rails and thereby protect the IC from damage. Typically, the clamps are implemented using relatively large metal oxide semiconductor field effect transistors (MOSFETs). A trigger circuit is used to detect the fast rising transient voltage and keep the clamp conducting for the duration of the ESD event. Thus, the trigger circuit typically includes a detection circuit and a timing control circuit. The detection circuit may include an RC (resistor-capacitor) "high pass" filter to differentiate between an ESD event and a regular power-up event, so that the trigger circuit does not turn on the clamp during the regular power-up event. Also, the timing control circuit may include a latch and positive feedback to hold the clamp in a full on condition for a specific amount of time to ensure that the clamp stays conductive during the entire duration of an ESD event. If the clamp is turned on during a false triggering of an ESD event the timing control circuit will ensure that the clamp will return to a non-conductive state within a relatively short amount of time to avoid excessive supply current and thermal damage of the clamp due to self-heating. False triggering of an ESD event can happen when the power supply voltage ramps up very quickly, or may happen in response to parasitic voltage spikes on the power supply.

FIG. 1 illustrates, in schematic diagram form, ESD protection circuit 10 in accordance with the prior art. ESD protection circuit 10 includes trigger circuit 11 and N-channel metal oxide semiconductor (NMOS) clamping transistor 20. Trigger circuit 11 includes detection circuit 12, current source 14, inverter 16, inverter 18, and polysilicon resistor 39. Detection circuit 12 includes PMOS capacitor 22 and NMOS resistor 24. Detection circuit 12 is implemented as an RC filter circuit for detecting a transient voltage on a power supply voltage terminal labeled "VDD". Current source 14 includes PMOS transistors 26 and 30 configured as a current mirror and NMOS transistor 28. Inverter 16 includes PMOS transistor 32 and NMOS transistor 34. Inverter 18 includes PMOS transistor 36 and NMOS transistor 38. NMOS clamp transistor 20 is connected between VDD and a power supply voltage terminal labeled "VSS". An output signal of second inverter 18 labeled "TRIGGER" is provided to control the gate of clamp transistor 20. Resistor 39 is connected between the gate of clamping transistor 20 and VSS. Not shown in FIG. 1 is the circuitry desired to be protected, such as for example, output drivers, input buffers, and other circuitry typically required for input/output (I/O) operation.

Detection circuit 12 monitors the voltage at VDD for an ESD event and turns on clamping transistor 20 when an ESD event is detected. During normal powered up operation with no detected transient voltage, node N1 at the output of detection circuit 12 is at a low level (VSS) and NMOS transistor 34 is turned off, or substantially non-conductive. The node TRIGGER at the gate of clamping transistor 20 is pulled low by resistor 39 causing transistor 20 to be off. Transistor 32 is on, causing a voltage at node N2 at the input of inverter 18 to be maintained at a high level (VDD). The state of inverter 18 is essentially latched by the action of transistors 32 and 34. The output of inverter 18 is low, thereby assisting resistor 39 in pulling the gate of transistor 20 at node TRIGGER to a low level. During an ESD event, detection circuit 12 detects a fast voltage increase on power supply rail VDD. The detected voltage increase causes the voltage at node N1 to be increased due to the gate capacitance of PMOS transistor 22 pulling node N1 high. The higher voltage at node N1 causes NMOS transistor 34 to be conductive. Node N2 at the input of inverter 18 is pulled low by NMOS transistor 34. Inverter 18 outputs a logic high signal to the gate of clamping NMOS transistor 20 at node TRIGGER, causing clamping NMOS transistor 20 to be conductive. In inverter 18, PMOS transistor 36 is a relatively large device to pull the signal at node TRIGGER up very quickly.

In order to achieve a reasonably long on-time of clamping transistor 20, inverter 18 remains latched for a predetermined time after node N1 returns to a low voltage and NMOS transistor 34 turns off. This is accomplished by the relatively high intrinsic gate capacitance of PMOS transistor 36 which functions to resist a rapid voltage change on node N2. The charging voltage for the large intrinsic gate capacitance is provided by current source 14 via the drain of PMOS transistor 30. Current source 14 is turned on only during an ESD event. The high trigger signal TRIGGER causes NMOS transistor 28 to be turned on, or made conductive. The drain current of NMOS transistor 28 is provided at node N2 via the current mirror formed by PMOS transistors 26 and 30. When detection circuit 12 no longer detects a rapidly changing transient voltage on VDD, the voltage at node N1 returns low, causing NMOS transistor 34 to be turned off. A relatively small current flow through PMOS transistor 30 maintains the gate capacitance of PMOS transistor 36 causing the voltage at node N2 to rise from a low to a high level whereas the time needed for this transition determines the on-time of the trigger circuit.

When the ramping voltage at node N2 reaches the switching point of inverter 18, inverter 18 changes states, causing the trigger signal at node TRIGGER to return to a logic low, thus turning clamping NMOS transistor 20 off. This completes the transitioning of the logic state of inverter 16 by turning on PMOS transistor 32 and pulling node N2 to VDD. The active feedback from node TRIGGER to inverter 16 via PMOS transistor 32 causes a very rapid turn-off (or de-latching) of trigger circuit 11. NMOS transistor 20 is relatively large to shunt current during the ESD event. If transistor 20 is turned off too quickly, a voltage spike may occur on the power supply line. The voltage spike may be caused by power supply inductance that resists a fast change in current flow.

FIG. 2 illustrates a diagram of various signals of ESD protection circuit 10 of FIG. 1. Note that the signals of FIG. 2 transition between a low voltage level labeled "L" and a high voltage level labeled "H", where the low voltage level L may be ground (e.g. VSS) and the high voltage level may be a voltage level of a positive power supply voltage (e.g. VDD). As illustrated in FIG. 2, power supply voltage VDD is powered up at time T1. For illustration of clamp triggering and clamp turn-off behaviors of ESD protection circuit 10, a relatively fast power-up ramp is used to induce false triggering of an ESD event. The relatively fast transiting power up voltage causes the voltage at node N1 to increase and the voltage at node N2 to decrease. The voltage of trigger signal TRIGGER increases causing clamping transistor 20 to become conductive and shunt current to VSS. When the voltage at VDD stabilizes, the voltage at node N1 drops. When the voltage at node N1 drops sufficiently, transistor 34 becomes substantially non-conductive and the voltage at node N2 gradually increases. When the voltage at node N2 increases to the switching point of inverter 18, output voltage TRIGGER decreases rapidly, causing clamping transistor 20 to turn off, or become substantially non-conductive at time T2. The voltage of trigger signal TRIGGER is still relatively high when the logic state of inverter 18 changes. Clamping transistor 20 may turn off relatively fast causing a voltage spike on power supply voltage VDD as illustrated in FIG. 2. The voltage spike can also be seen in the waveforms of the voltages at nodes N1 and N2.

The advantages of using a latch in ESD protection circuit 10 include layout area efficiency and resilience to false triggering. However, due the inherent nature of a latch, the turn-off of the clamp transistor can happen very fast, thus causing voltage spikes due the power supply inductance. The voltage spikes can cause electrical overstress (EOS) damage in the IC. In some cases, the voltage spikes can cause re-triggering of the ESD protection circuit, which can put the IC into a state of repetitive ESD clamp turn-on cycles drawing continuous supply current. This may render the IC non-functional and may lead to overheating and failure of the IC.

Therefore, what is needed is an ESD protection circuit that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
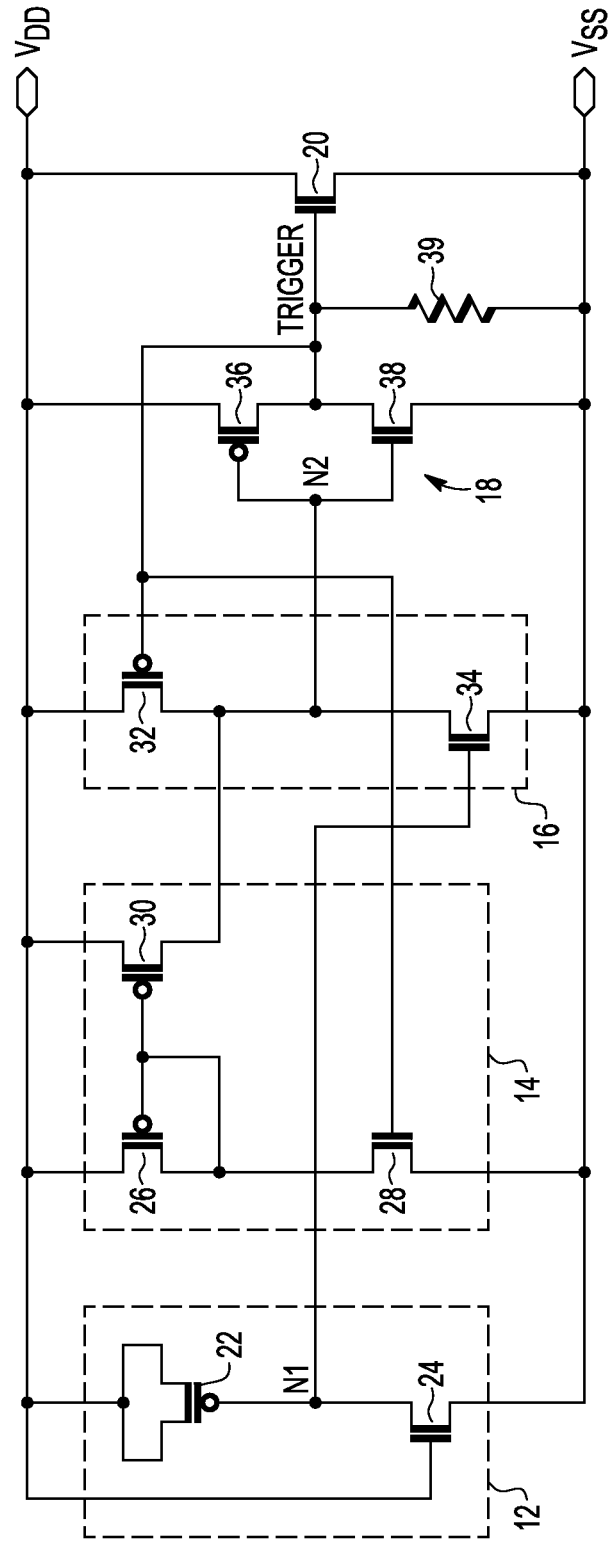
FIG. 1 illustrates, in schematic diagram form, an ESD protection circuit in accordance with the prior art.

Generally, there is provided, an ESD protection circuit having a trigger circuit that turns off a clamping transistor more slowly than prior art trigger circuits. The trigger circuit includes a timing circuit and a latch with feedback to provide the slower timing. In one embodiment, the timing circuit comprises two inverter stages with one inverter stage implemented as a delay element. The turn-off delay is achieved by the delay element having an inverter switch point that has been lowered from a typical mid-level voltage to about a threshold voltage of an NMOS transistor. More slowly turning off the clamping transistor avoids a voltage spike due to inductive power supply voltage lines.

In one aspect, there is provided, an electrostatic discharge (ESD) protection circuit including: a clamping transistor having a first current electrode coupled to a first power supply voltage terminal, a second current electrode coupled to a second power supply voltage terminal, and a control electrode; and a trigger circuit including: a detection circuit having an input terminal coupled to monitor a power supply voltage, and having an output terminal; a first transistor having a first current electrode coupled to the first power supply voltage terminal, a control electrode, and a second current electrode; a second transistor having a first current electrode coupled to the second current electrode of the first transistor, a control electrode coupled to the output terminal of the detection circuit, and a second current electrode coupled to the second power supply voltage terminal; a first inverter having an input terminal coupled to the second current electrode of the first transistor, and an output terminal coupled to the control electrode of the clamping transistor; a second inverter having an input terminal coupled to the output terminal of the first inverter, and an output terminal, wherein the second inverter having a switching voltage that is substantially lower than a midpoint voltage of a power supply voltage provided to the first and second power supply voltage terminals; and a third inverter having an input terminal coupled to the output terminal of the second inverter, and an output terminal coupled to the control electrode of the first transistor. The second inverter may include: a third transistor having a first current electrode coupled to the first power supply voltage terminal, a control electrode coupled to the output terminal of the first inverter, and a second current electrode; a fourth transistor having a first current electrode coupled to the second current electrode of the third transistor, a control electrode coupled to the output terminal of the first inverter, and a second current electrode coupled to the input terminal of the third inverter; a fifth transistor having a first current electrode coupled to the second current electrode of the fourth transistor, a control electrode coupled to the output terminal of the first inverter, and a second current electrode coupled to the second power supply voltage terminal; and a sixth transistor having a first current electrode coupled to the second current electrode of the third transistor, a control electrode coupled to the second current electrode of the fourth transistor, and a second current electrode coupled to the second power supply voltage terminal. The third transistor may be sized to provide a relatively higher channel resistance than a channel resistance of the fourth transistor. The sixth transistor may have a relatively lower channel resistance than a channel resistance of the fourth transistor. The ESD protection circuit may further include: a seventh transistor having a first current electrode coupled to the first power supply voltage terminal, and a control electrode and a second current electrode coupled together; an eighth transistor having a first current electrode coupled to the second current electrode of the seventh transistor, a control electrode coupled to the output terminal of the third inverter, and a second current electrode coupled to the second power supply voltage terminal; and a ninth transistor having a first current electrode coupled to the first power supply voltage terminal, a control electrode coupled to the control electrode of the seventh transistor, and a second current electrode coupled to the input terminal of the first inverter. A ratio of channel length to channel width of the third transistor may be substantially higher than a ratio of channel length to channel width of the fourth transistor. A ratio of channel length to channel width of the sixth transistor may be substantially less than a ratio of channel length to channel width of the fourth transistor. The detection circuit may include: a capacitive element having a first terminal coupled to the first power supply voltage terminal, and a second terminal coupled to the output terminal of the detection circuit; and a resistive element having a first terminal coupled to the second terminal of the capacitive element, and a second terminal coupled to the second power supply voltage terminal. The ESD protection circuit may further include a resistive element having a first terminal coupled to the control electrode of the clamping transistor, and a second terminal coupled to the second power supply voltage terminal.

In another aspect, there is provided, an electrostatic discharge (ESD) protection circuit including: a clamping transistor having a first current electrode coupled to a first power supply voltage terminal, a second current electrode coupled to a second power supply voltage terminal, and a control electrode; and a trigger circuit including: a transient detection circuit coupled to monitor a power supply voltage and having an output terminal; a first transistor having a first current electrode coupled to the first power supply voltage terminal, a control electrode, and a second current electrode; a second transistor having a first current electrode coupled to the second current electrode of the first transistor, a control electrode coupled to the output terminal of the transient detection circuit, and a second current electrode coupled to the second power supply voltage terminal; a first inverter having an input terminal coupled to the second current electrode of the first transistor, and an output terminal for providing a trigger signal to the control electrode of the clamping transistor; a second inverter having an input terminal coupled to the output terminal of the first inverter, and an output terminal, wherein the second inverter having a switching voltage that is substantially lower than a midpoint voltage of a power supply voltage provided to the first and second power supply voltage terminals; and a third inverter having an input terminal coupled to the output terminal of the second inverter, and an output terminal coupled to the control electrode of the first transistor, wherein the clamping transistor is conductive when the trigger voltage is at a first voltage level, wherein the clamping transistor is substantially non-conductive when the trigger voltage is at a second voltage level, and wherein the second inverter and third inverter are enabled to control a rate at which the trigger voltage transitions from the first voltage level to the second voltage level by delaying when a logic state of the first inverter changes following detection of a fast rising voltage the first power supply voltage terminal by the detection circuit. The second inverter may include: a third transistor having a first current electrode coupled to the first power supply voltage terminal, a control electrode coupled to the output terminal of the first inverter, and a second current electrode; a fourth transistor having a first current electrode coupled to the second current electrode of the third transistor, a control electrode coupled to the output terminal of the first inverter, and a second current electrode coupled to the input terminal of the third inverter; a fifth transistor having a first current electrode coupled to the second current electrode of the fourth transistor, a control electrode coupled to the output terminal of the first inverter, and a second current electrode coupled to the second power supply voltage terminal; and a sixth transistor having a first current electrode coupled to the second current electrode of the third transistor, a control electrode coupled to the second current electrode of the fourth transistor, and a second current electrode coupled to the second power supply voltage terminal. The third transistor may be sized to provide a relatively higher channel resistance than a channel resistance of the fourth transistor. The sixth transistor may have a relatively lower channel resistance than a channel resistance of the fourth transistor. A ratio of channel length over channel width of the third transistor may be substantially higher than a ratio of channel length over channel width of the fourth transistor. A ratio of channel length over channel width of the sixth transistor may be substantially less than a ratio of channel length over channel width of the fourth transistor. The ESD protection circuit may further include: a seventh transistor having a first current electrode coupled to the first power supply voltage terminal, and a control electrode and a second current electrode coupled together; an eighth transistor having a first current electrode coupled to the second current electrode of the seventh transistor, a control electrode coupled to the output terminal of the third inverter, and a second current electrode coupled to the second power supply voltage terminal; and a ninth transistor having a first current electrode coupled to the first power supply voltage terminal, a control electrode coupled to the control electrode of the seventh transistor, and a second current electrode coupled to the input terminal of the first inverter.

In yet another aspect, there is provided, an electrostatic discharge (ESD) protection circuit including: a clamping transistor having a first current electrode coupled to a first power supply voltage terminal, a second current electrode coupled to a second power supply voltage terminal, and a control electrode; and a trigger circuit including: a transient detection circuit coupled to monitor a power supply voltage and having an output terminal; a first transistor having a first current electrode coupled to the first power supply voltage terminal, a control electrode, and a second current electrode; a second transistor having a first current electrode coupled to the second current electrode of the first transistor, a control electrode coupled to the output terminal of the transient detection circuit, and a second current electrode coupled to the second power supply voltage terminal; a first inverter having an input terminal coupled to the second current electrode of the first transistor, and an output terminal for providing a trigger signal to the control electrode of the clamping transistor; a second inverter including: a third transistor having a first current electrode coupled to the first power supply voltage terminal, a control electrode coupled to the output terminal of the first inverter, and a second current electrode; a fourth transistor having a first current electrode coupled to the second current electrode of the third transistor, a control electrode coupled to the output terminal of the first inverter, and a second current electrode coupled to the input terminal of the third inverter; a fifth transistor having a first current electrode coupled to the second current electrode of the fourth transistor, a control electrode coupled to the output terminal of the first inverter, and a second current electrode coupled to the second power supply voltage terminal; and a sixth transistor having a first current electrode coupled to the second current electrode of the third transistor, a control electrode coupled to the second current electrode of the fourth transistor, and a second current electrode coupled to the second power supply voltage terminal; and a third inverter having an input terminal coupled to the output terminal of the second inverter, and an output terminal coupled to the control electrode of the first transistor. A ratio of channel length over channel width of the third transistor may be substantially higher than a ratio of channel length over channel width of the fourth transistor. A ratio of channel length over channel width of the sixth transistor may be substantially less than a ratio of channel length over channel width of the fourth transistor. The ESD protection circuit may further include a resistive element having a first terminal coupled to the control electrode of the clamping transistor, and a second terminal coupled to the second power supply voltage terminal.

As used herein the term metal-oxide-semiconductor and the abbreviation MOS are to be interpreted broadly, in particular, it should be understood that they are not limited merely to structures that use "metal" and "oxide" but may employ any type of conductor including "metal" and any type of dielectric including "oxide". The term field effect transistor is abbreviated as "FET".

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Figure 3:
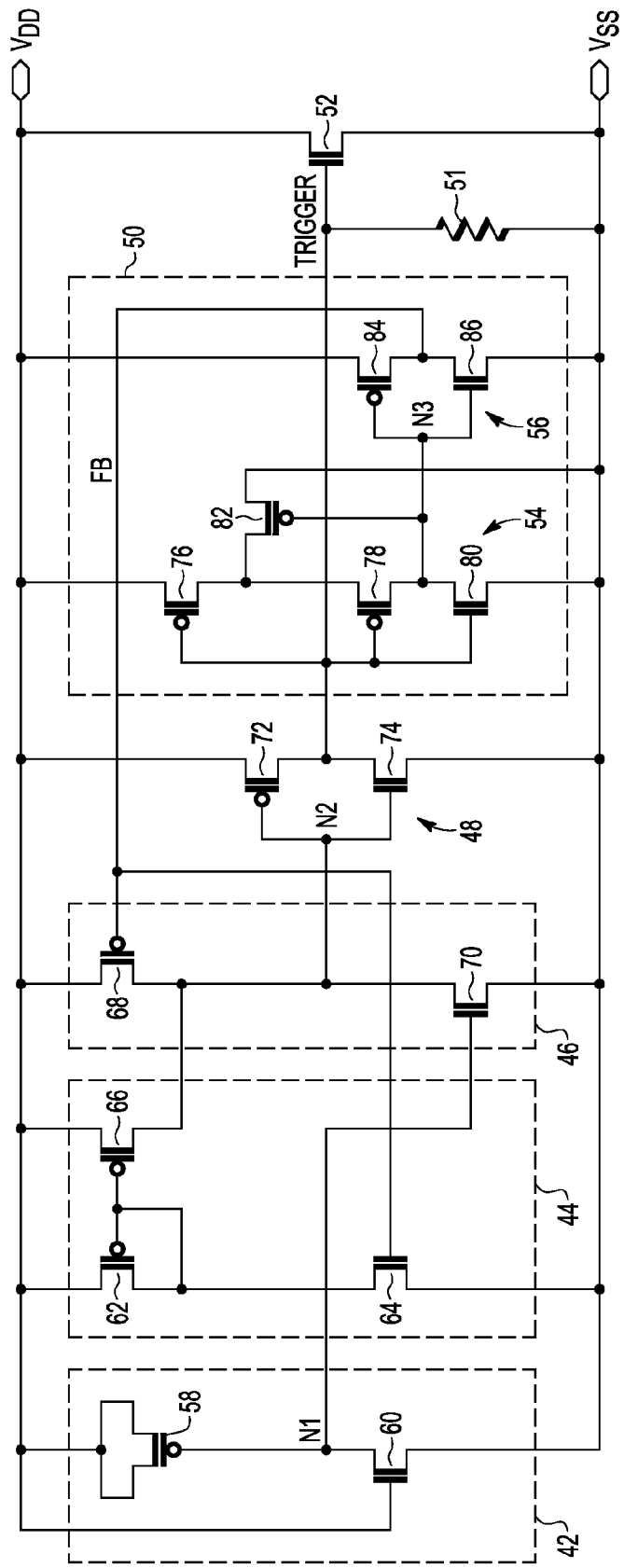
FIG. 3 illustrates, in schematic diagram form, an ESD protection circuit in accordance with an embodiment.

FIG. 3 illustrates, in schematic diagram form, an ESD protection circuit 40 in accordance with an embodiment. In one embodiment, ESD protection circuit 40 may be part of a distributed ESD protection network on an IC, where one trigger circuit is used to control multiple transistor clamps positioned with corresponding I/O circuitry. ESD protection circuit 40 includes trigger circuit 41 and NMOS clamping transistor 52. Trigger circuit 41 includes detection circuit 42, current source 44, inverter 46, inverter 48, timing circuit 50, and polysilicon resistor 51. Detection circuit 42 includes PMOS capacitor 58 and NMOS resistor 60. In other embodiments, detection circuit 42 may be implemented differently, for example, a polysilicon resistor may be used instead of NMOS resistor 60 or a varactor may be used instead of PMOS transistor 58. Current source 44 includes PMOS transistors 62 and 66 and NMOS transistor 64. Inverter 46 includes PMOS transistor 68 and NMOS transistor 70. Inverter 48 includes PMOS transistor 72 and NMOS transistor 74. Timing circuit 50 includes delay element 54 and inverter 56. Delay element 54 includes PMOS transistors 76, 78, and 82 and NMOS transistor 80. Inverter 56 includes PMOS transistor 84 and NMOS transistor 86.

NMOS clamping transistor 52 has a drain connected to VDD, a gate connected to the output of inverter 48 for receiving trigger voltage TRIGGER, and a source connected to VSS. In another embodiment, clamping transistor 52 may be a different type of transistor, for example, a PMOS transistor or a bipolar transistor.

In detection circuit 42, PMOS capacitor 58 has first and second source/drain terminals connected to power supply voltage terminal VDD, and a gate connected to a node labeled "N1". NMOS resistor 60 has a drain (first current electrode) connected to node N1, a source (second current electrode) connected to power supply voltage terminal VSS, and a gate (control electrode) connected to the VDD.

In current source 44, PMOS transistor 62 has a source connected to VDD, and a gate and a drain connected together. PMOS transistor 66 has a source connected to VDD, a gate connected to the gate and drain of transistor 62, and a drain connected to a node labeled "N2". NMOS transistor 64 has a drain connected to the drain of transistor 62, a source connected to VSS, and a gate.

In inverter 46, PMOS transistor 68 has a source connected to VDD, a gate, and a drain connected to the drain of transistor 66. NMOS transistor 70 has a drain connected to the drain of transistor 68 at node N2, a gate connected to node N1, and a source connected to VSS.

In inverter 48, PMOS transistor 72 has a source connected to VDD, a gate connected to node N2, and a drain connected to an output terminal for providing trigger voltage TRIGGER. NMOS transistor 74 has a drain connected to the drain of transistor 72, a gate connected to the gate of transistor 72, and a source connected to VSS.

In timing circuit 50, PMOS transistor 76 has a source connected to VDD, a gate connected to the drain of transistor 72, and a drain. PMOS transistor 78 has a source connected to the drain of transistor 76, a gate connected to the drain of transistor 72, and a drain connected to a node labeled "N3". NMOS transistor 80 has a drain connected to the drain of transistor 78, a gate connected to the drain of transistor 72, and a source connected to VSS. PMOS transistor 82 has a first source/drain electrode connected to the drain of transistor 76, a gate connected to the drain of transistor 78, and a second source/drain electrode connected to VSS. In inverter 56, PMOS transistor 84 has a source connected to VDD, a gate connected to the drain of transistor 78 at node N3, and a drain connected to the gates of transistors 68 and 64 for providing a feedback signal labeled "FB". NMOS transistor 86 has a drain connected to the drain of transistor 84, a gate connected to the gate of transistor 84 and a source connected to VSS.

Resistor 51 has a first terminal connected to the output terminal of inverter 48, and a second terminal connected to VSS.

Initially, during normal powered-up operation with no detected transient voltage, node N1 at the output of detection circuit 42 is low and NMOS transistor 70 is turned off. NMOS clamping transistor 52 is off, or substantially non-conductive, and is held off by resistor 51 pulling the gate of NMOS transistor 52 at node TRIGGER low. Timing circuit 50 provides a logic low feedback signal FB at the gate of PMOS transistor 68. PMOS transistor 68 is therefore conductive causing a high voltage at node N2. The output of inverter 48 at node TRIGGER is low, thereby assisting resistor 51 in pulling the gate of clamping transistor 52 low. The state of inverter 48 is essentially latched by the action of transistors 68 and 70 in that the logic state of inverter 48 is held by the conducting PMOS transistor 68 and the non-conducting NMOS transistor 70. Transistor 64 is off because of the low feedback signal FB and therefore current source 44 is off.

Detection circuit 42 monitors the voltage level between power supply voltage terminals VDD and VSS for a transient voltage change indicating an ESD event. When a fast rising voltage at VDD is detected, detection circuit 42 causes NMOS clamping transistor 52 to be turned on to shunt the ESD current from VDD to VSS. When detection circuit 42 detects a fast rising voltage on power supply rail VDD the voltage at node N1 increases because the gate capacitance of PMOS transistor 58 pulls node N1 high. The higher voltage at node N1 causes NMOS transistor 70 to be conductive. Node N2 at the input of inverter 48 is pulled low by conductive NMOS transistor 70. PMOS transistor 68 is initially conductive at the same time transistor 70 is conductive. Transistor 68 pulls node N2 high against the direction imposed by NMOS transistor 70. However, the on-resistance of NMOS transistor 70 is designed to be lower than the on-resistance of PMOS transistor 68; therefore, node N2 is effectively pulled low.

Inverter 48 provides a high trigger signal at node TRIGGER to the gate of NMOS clamping transistor 52, causing clamping transistor 52 to be conductive. PMOS transistor 72 of inverter 48 is typically a relatively large device so that the trigger signal at node TRIGGER is pulled up very quickly. Timing circuit 50 provides a logic high signal at the FB node through delay element 54 and inverter 56. With its gate terminal at the FB node pulled high, PMOS transistor 68 turns off and lets node N2 stay at a low voltage level as imposed by pull-down NMOS transistor 70. When detection circuit 42 no longer detects a rapidly rising transient voltage on VDD, the voltage at node N1 returns low, causing NMOS transistor 70 to be turned off. With both NMOS transistor 70 and PMOS transistor 68 turned off, node N2 enters into a high impedance state. The voltage at node N2 eventually returns to a high voltage, and the trigger signal at node TRIGGER returns low, turning clamping transistor 52 off. In order to ensure that clamping transistor 52 remains on for a sufficient amount of time, for example to shunt all of the ESD current, inverter 48 remains latched in a high output state for a predetermined time after node N1 returns to a low voltage. This is accomplished by the relatively high intrinsic gate capacitance of PMOS transistor 72, which resists a rapid voltage change on node N2. The charging voltage for the intrinsic gate capacitance at node N2 is provided by current source 44. Current source 44 is turned on only when trigger circuit 41 is engaged. The high trigger signal TRIGGER causes NMOS transistor 64 to be turned on, or made conductive, by feedback signal FB through delay element 54 and inverter 56 of timing circuit 50. A relatively small current flow through PMOS transistor 66 gradually discharges the gate capacitance of PMOS transistor 72 during the ESD event as the voltage at node N2 gradually increases from a low level to a high level. The time needed for this transition determines the on-time of the trigger circuit. When the voltage at node N2 exceeds the switching point of inverter 48, inverter 48 de-latches, trigger circuit 41 transitions back into the off state, and after the trigger signal at node TRIGGER goes low, current mirror 44 is turned off in response to a logic low feedback signal FB.

Figure 2:
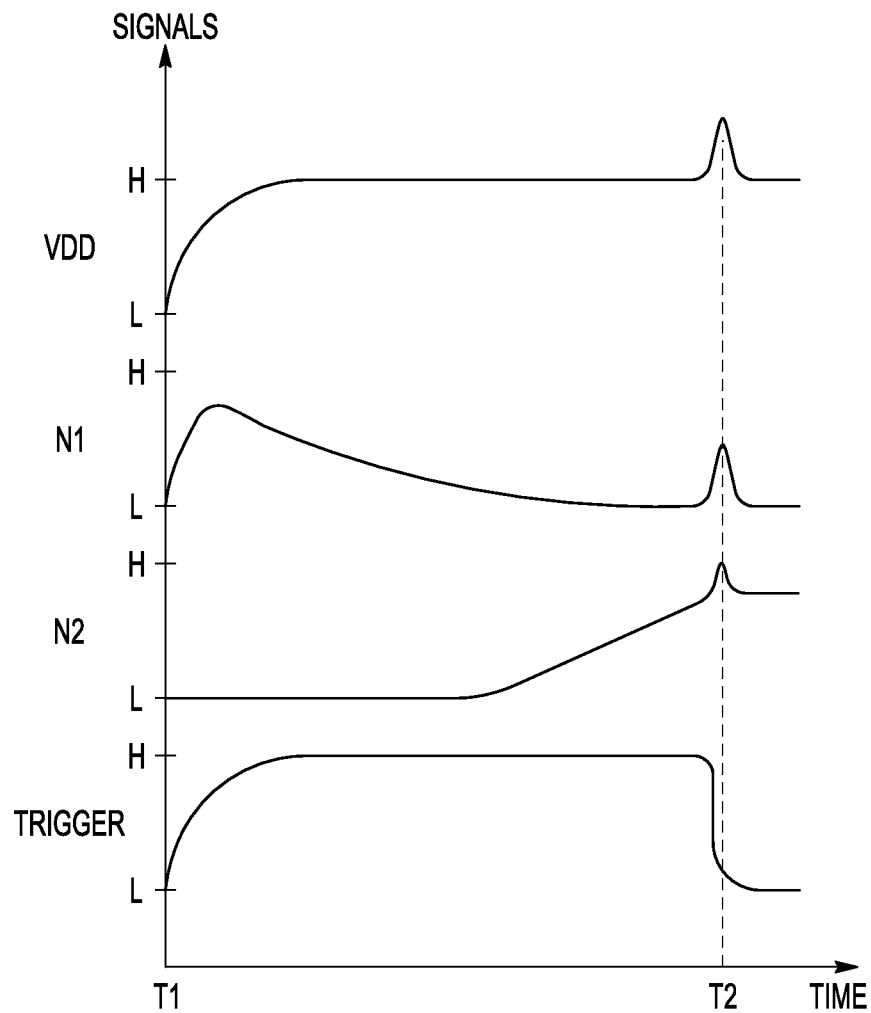
FIG. 2 illustrates a diagram of various signals of the ESD protection circuit of FIG. 1.

To handle the large current flow during an ESD event, NMOS transistor 52 is relatively large. At the end of the ESD event, clamping transistor 52 is turned off. When the relatively large transistor 52 switches from an on state to an off state, a voltage spike may occur because of power supply line inductance. The voltage spike is illustrated in the waveforms of FIG. 2 and discussed above. To prevent the voltage spike in ESD protection circuit 40, timing circuit 50 controls how fast trigger signal TRIGGER transitions from a logic high voltage back to a logic low voltage. Delay element 54 is constructed as an inverter with a relatively low switching point. That is, the output of delay element 54 switches from a logic low to a logic high when the trigger signal at node TRIGGER transitions from high to low past a voltage that is substantially lower than a midpoint of a power supply voltage. In one embodiment, the switching point of delay element 54 is approximately a threshold voltage (VT) of NMOS clamp transistor 52.

To have a relatively low switching point, delay element 54, which essentially function as an inverter state, includes PMOS transistors 76 and 82. PMOS transistor 76 is characterized as being a "long channel" device having a relatively high channel on-resistance. That is, PMOS transistor 76 has a ratio of channel length to channel width (L/W) that is substantially higher than the channel length to width ratio of other "standard size" PMOS transistors of the integrated circuit, for example PMOS transistor 78. When PMOS transistor 76 is conductive, a resistance between the drain and source terminals of PMOS transistor 76 is relatively high compared to, for example, the resistance of PMOS transistor 78. On the other hand, PMOS transistor 82 has a relatively wide channel region compared to "standard size" PMOS transistors of the integrated circuit, for example, PMOS transistor 78. That is, PMOS transistor 82 has a ratio of channel length to channel width that is substantially lower than the channel length to width ratios of the "standard size" PMOS transistors of the integrated circuit. Therefore, PMOS transistor 82 has a relatively low channel resistance when PMOS transistor 82 is conductive. When the trigger signal at node TRIGGER transitions from high to low, both PMOS transistors 76 and 82 are initially conductive and are forming a voltage divider between VDD and VSS. The divided voltage on the drain terminal of PMOS transistor 76 is relatively low (i.e. substantially closer to VSS than to VDD) due to the lower channel resistance of PMOS transistor 82 as compared to PMOS transistor 76. At the beginning of the transition of the trigger signal at node TRIGGER from high to low, NMOS transistor 80 is also conducting, pulling node N3 low and maintaining the logic low signal at the output of delay element 54. As the trigger signal at node TRIGGER approaches the threshold voltage of NMOS transistor 80, transistor 80 starts to become less conductive, letting the voltage on node N3 to rise. With the rising voltage on node N3, PMOS transistor 82 becomes less conductive, letting the voltage on the drain electrode of PMOS transistor 76 to rise. This further increases the voltage on node N3 via PMOS transistor 78 and, due this positive feedback loop, the node N3 voltage flips back to a logic high level. With properly sized transistor elements of delay element 54, a very low switch point can be achieved that approximately matches the threshold voltage of NMOS transistor 52.

When clamp transistor 52 "falsely" turns on during regular, powered-up operation of the IC, for example due to a fast power-up ramp or due to a parasitic voltage spike on the power supply, the clamp will return to a non-conductive state within the defined on-time of trigger circuit 41. To prevent a voltage spike from occurring on the power supply when transistor 52 switches off, for example, due to inductance on the supply line, timing circuit 50 controls a rate at which the trigger signal voltage at node TRIGGER transitions from a logic high voltage level to a logic low voltage level. This is done by delaying when PMOS transistor 68 becomes conductive at the end of a turn-on cycle of trigger circuit 41. As compared to prior art circuit 10, the gate of transistor 68 is not directly controlled by the output of inverter 48 at node TRIGGER, but by the output of timing circuit 50 at node FB. During the ESD detection of a fast rising voltage on VDD, the trigger signal at node TRIGGER and node FB are high and transistor 68 is off. However, a relatively small output current of current source 44 (i.e. the mirror current through transistor 66) causes the voltage at node N2 to gradually increase. When the voltage at node N2 approaches the switching point of inverter 48 the voltage of the TRIGGER signal starts decreasing due to resistor 51 and NMOS transistor 74 trying to pull the trigger signal down. However, the gate of PMOS transistor 68 does not change to a logic low voltage until delay stage 54 and inverter 56 change state to provide a logic low feedback voltage FB to the gate of PMOS transistor 68. Therefore, the decrease in the voltage of the trigger signal occurs relatively slowly while PMOS transistor 68 remains non-conductive. The slew rate of the TRIGGER signal during its ramping down is determined by the ramping up slew rate of the voltage at node N2 multiplied by the voltage gain of inverter 48. Due to delay element 54 having a very low switch point, the output of delay element 54 at node N3 does not change to a high voltage until the TRIGGER signal approaches an NMOS threshold voltage. At that time, the output of inverter 56 provides a logic low feedback signal FB to the gate of PMOS transistor 68. Transistor 68 becomes conductive and node N2 is strongly driven to VDD. The trigger signal at node TRIGGER, whose voltage is at about an NMOS threshold voltage at this time, rapidly completes its transition to VSS and clamping transistor 52 changes from a weakly conductive state (i.e. almost completely turned off) to a non-conductive state. By waiting until the voltage of trigger signal TRIGGER has dropped substantially (i.e. to approximately an NMOS transistor threshold voltage) and relatively slowly before de-latching inverter 48 via the feedback signal at node FB, a large voltage spike on VDD because of transistor 52 suddenly becoming non-conductive is avoided.

Figure 4:
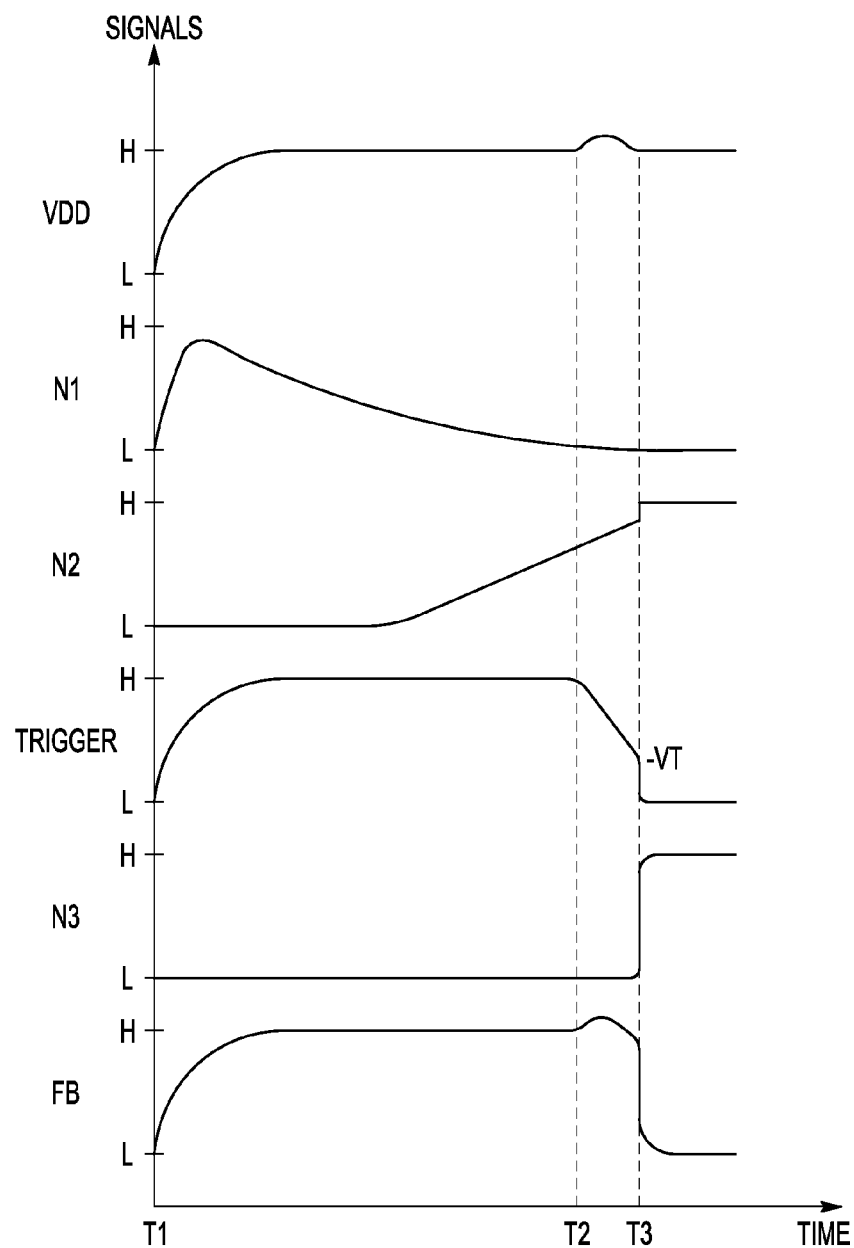
FIG. 4 illustrates a diagram of various signals of the ESD protection circuit of FIG. 3.

FIG. 4 illustrates a diagram of various signals of ESD protection circuit 40 of FIG. 3. Note that the signals of FIG. 4 transition between a low voltage level labeled "L" and a high voltage level labeled "H", where the low voltage level L may be ground (e.g. VSS) and the high voltage level may be a positive voltage level (e.g. VDD). In other embodiments, the high and low voltage levels may be different. As illustrated in FIG. 4, power supply voltage VDD is powered up at time T1. If the power supply voltage increases too quickly, it may be falsely interpreted as an ESD event by detection circuit 42. As can be seen in FIG. 4, the relatively fast transiting power up voltage causes the voltage at node N1 to increase. Transistor 70 is conductive, causing the voltage at node N2 to stay at the "L" level. Trigger signal TRIGGER of inverter 48 increases causing clamping transistor 52 to become conductive and shunt current from VDD to VSS. When the voltage at VDD stabilizes, detection circuit 42 no longer detects a transient voltage and the voltage at node N1 drops. When the voltage at node N1 drops sufficiently, transistor 70 becomes substantially non-conductive and the voltage at node N2 gradually increases because of the output current of current source 44 (i.e. the mirror current of PMOS transistor 66). The voltage of trigger signal TRIGGER decreases because of resistor 51, as illustrated between times T2 and T3 in FIG. 4. Delay stage 54 switches states causing node N3 to become high at time T3. Feedback signal FB becomes low, causing transistor 68 to be conductive. Transistor 68 does not become conductive to pull node N2 high until the voltage of trigger signal TRIGGER is about an NMOS threshold voltage drop above VSS. The conductive transistor 68 pulls node N2 high and inverter 48 outputs a logic low trigger signal TRIGGER. Because trigger signal TRIGGER has a relatively low voltage when inverter 48 changes state, the voltage spike on VDD is greatly decreased.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciate that conductivity types and polarities of potentials may be reversed. For example, NMOS clamping transistor 52 may be implemented as a PMOS transistor, and the illustrated trigger circuit reversed to control a PMOS clamping transistor.

Although the invention is described herein with reference to specific embodiments, various modifications and changes can be made without departing from the scope of the present invention as set forth in the claims below. For example, in another embodiment, the detection circuit 42 may be coupled between VSS and a boosted supply voltage node while the claiming transistor 52 is coupled between VSS and VDD. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An electrostatic discharge (ESD) protection circuit comprising:
   a clamping transistor having a first current electrode coupled to a first power supply voltage terminal, a second current electrode coupled to a second power supply voltage terminal, and a control electrode; and
   a trigger circuit comprising:
      a detection circuit having an input terminal coupled to monitor a power supply voltage, and having an output terminal;
      a first transistor having a first current electrode coupled to the first power supply voltage terminal, a control electrode, and a second current electrode;
      a second transistor having a first current electrode coupled to the second current electrode of the first transistor, a control electrode coupled to the output terminal of the detection circuit, and a second current electrode coupled to the second power supply voltage terminal;
      a first inverter having an input terminal coupled to the second current electrode of the first transistor, and an output terminal coupled to the control electrode of the clamping transistor for providing a trigger signal to the control electrode of the clamping transistor;
      a second inverter having an input terminal coupled to the output terminal of the first inverter, and an output terminal, wherein the second inverter having a switching voltage that is lower than a midpoint voltage of a power supply voltage provided to the first and second power supply voltage terminals; and
      a third inverter having an input terminal coupled to the output terminal of the second inverter, and an output terminal coupled to the control electrode of the first transistor and not coupled to the control electrode of the clamping transistor, wherein the third inverter is configured to provide a feedback signal to the first transistor that is distinct from the trigger signal provided by the first inverter to the clamping transistor.

2. The ESD protection circuit of claim 1, wherein the second inverter comprises:
   a third transistor having a first current electrode coupled to the first power supply voltage terminal, a control electrode coupled to the output terminal of the first inverter, and a second current electrode;
   a fourth transistor having a first current electrode coupled to the second current electrode of the third transistor, a control electrode coupled to the output terminal of the first inverter, and a second current electrode coupled to the input terminal of the third inverter;
   a fifth transistor having a first current electrode coupled to the second current electrode of the fourth transistor, a control electrode coupled to the output terminal of the first inverter, and a second current electrode coupled to the second power supply voltage terminal; and
   a sixth transistor having a first current electrode coupled to the second current electrode of the third transistor, a control electrode coupled to the second current electrode of the fourth transistor, and a second current electrode coupled to the second power supply voltage terminal.

3. The ESD protection circuit of claim 2, wherein the third transistor is sized to provide a higher channel resistance than a channel resistance of the fourth transistor.

4. The ESD protection circuit of claim 2, wherein the sixth transistor has a lower channel resistance than a channel resistance of the fourth transistor.

5. The ESD protection circuit of claim 2, further comprising:
   a seventh transistor having a first current electrode coupled to the first power supply voltage terminal, and a control electrode and a second current electrode coupled together;
   an eighth transistor having a first current electrode coupled to the second current electrode of the seventh transistor, a control electrode coupled to the output terminal of the third inverter, and a second current electrode coupled to the second power supply voltage terminal; and
   a ninth transistor having a first current electrode coupled to the first power supply voltage terminal, a control electrode coupled to the control electrode of the seventh transistor, and a second current electrode coupled to the input terminal of the first inverter.

6. The ESD protection circuit of claim 2, wherein a ratio of channel length to channel width of the third transistor is higher than a ratio of channel length to channel width of the fourth transistor.

7. The ESD protection circuit of claim 2, wherein a ratio of channel length to channel width of the sixth transistor is less than a ratio of channel length to channel width of the fourth transistor.

8. The ESD protection circuit of claim 1, wherein the detection circuit comprises:
   a capacitive element having a first terminal coupled to the first power supply voltage terminal, and a second terminal coupled to the output terminal of the detection circuit; and
   a resistive element having a first terminal coupled to the second terminal of the capacitive element, and a second terminal coupled to the second power supply voltage terminal.

9. The ESD protection circuit of claim 1, further comprising a resistive element having a first terminal coupled to the control electrode of the clamping transistor, and a second terminal coupled to the second power supply voltage terminal.

10. An electrostatic discharge (ESD) protection circuit comprising:
    a clamping transistor having a first current electrode coupled to a first power supply voltage terminal, a second current electrode coupled to a second power supply voltage terminal, and a control electrode; and
    a trigger circuit comprising:
       a transient detection circuit coupled to monitor a power supply voltage and having an output terminal;
       a first transistor having a first current electrode coupled to the first power supply voltage terminal, a control electrode, and a second current electrode;
       a second transistor having a first current electrode coupled to the second current electrode of the first transistor, a control electrode coupled to the output terminal of the transient detection circuit, and a second current electrode coupled to the second power supply voltage terminal;
       a first inverter having an input terminal coupled to the second current electrode of the first transistor, and an output terminal for providing a trigger signal to the control electrode of the clamping transistor;
       a second inverter having an input terminal coupled to the output terminal of the first inverter, and an output terminal, wherein the second inverter having a switching voltage that is lower than a midpoint voltage of a power supply voltage provided to the first and second power supply voltage terminals; and
       a third inverter having an input terminal coupled to the output terminal of the second inverter, and an output terminal coupled to the control electrode of the first transistor and not coupled to the control electrode of the clamping transistor, wherein the third inverter is configured to provide a feedback signal to the first transistor that is distinct from the trigger signal provided by the first inverter to the clamping transistor,
       wherein the clamping transistor is conductive when the trigger voltage is at a first voltage level, wherein the clamping transistor is non-conductive when the trigger voltage is at a second voltage level, and wherein the second inverter and third inverter are enabled to control a rate at which the trigger voltage transitions from the first voltage level to the second voltage level by delaying when a logic state of the first inverter changes following detection of a fast rising voltage the first power supply voltage terminal by the detection circuit.

11. The ESD protection circuit of claim 10, wherein the second inverter comprises:
    a third transistor having a first current electrode coupled to the first power supply voltage terminal, a control electrode coupled to the output terminal of the first inverter, and a second current electrode;
    a fourth transistor having a first current electrode coupled to the second current electrode of the third transistor, a control electrode coupled to the output terminal of the first inverter, and a second current electrode coupled to the input terminal of the third inverter;
    a fifth transistor having a first current electrode coupled to the second current electrode of the fourth transistor, a control electrode coupled to the output terminal of the first inverter, and a second current electrode coupled to the second power supply voltage terminal; and
    a sixth transistor having a first current electrode coupled to the second current electrode of the third transistor, a control electrode coupled to the second current electrode of the fourth transistor, and a second current electrode coupled to the second power supply voltage terminal.

12. The ESD protection circuit of claim 11, wherein the third transistor is sized to provide a higher channel resistance than a channel resistance of the fourth transistor.

13. The ESD protection circuit of claim 11, wherein the sixth transistor has a lower channel resistance than a channel resistance of the fourth transistor.

14. The ESD protection circuit of claim 11, wherein a ratio of channel length over channel width of the third transistor is higher than a ratio of channel length over channel width of the fourth transistor.

15. The ESD protection circuit of claim 11, wherein a ratio of channel length over channel width of the sixth transistor is less than a ratio of channel length over channel width of the fourth transistor.

16. The ESD protection circuit of claim 11, further comprising:
    a seventh transistor having a first current electrode coupled to the first power supply voltage terminal, and a control electrode and a second current electrode coupled together;

an eighth transistor having a first current electrode coupled to the second current electrode of the seventh transistor, a control electrode coupled to the output terminal of the third inverter, and a second current electrode coupled to the second power supply voltage terminal; and a ninth transistor having a first current electrode coupled to the first power supply voltage terminal, a control electrode coupled to the control electrode of the seventh transistor, and a second current electrode coupled to the input terminal of the first inverter.

17. An electrostatic discharge (ESD) protection circuit comprising:

a clamping transistor having a first current electrode coupled to a first power supply voltage terminal, a second current electrode coupled to a second power supply voltage terminal, and a control electrode; and a trigger circuit comprising:

a transient detection circuit coupled to monitor a power supply voltage and having an output terminal;

a first transistor having a first current electrode coupled to the first power supply voltage terminal, a control electrode, and a second current electrode;

a second transistor having a first current electrode coupled to the second current electrode of the first transistor, a control electrode coupled to the output terminal of the transient detection circuit, and a second current electrode coupled to the second power supply voltage terminal;

a first inverter having an input terminal coupled to the second current electrode of the first transistor, and an output terminal for providing a trigger signal to the control electrode of the clamping transistor;

a second inverter comprising:

a third transistor having a first current electrode coupled to the first power supply voltage terminal, a control electrode coupled to the output terminal of the first inverter, and a second current electrode;

a fourth transistor having a first current electrode coupled to the second current electrode of the third transistor, a control electrode coupled to the output terminal of the first inverter, and a second current electrode coupled to the input terminal of the third inverter;

a fifth transistor having a first current electrode coupled to the second current electrode of the fourth transistor, a control electrode coupled to the output terminal of the first inverter, and a second current electrode coupled to the second power supply voltage terminal; and a sixth transistor having a first current electrode coupled to the second current electrode of the third transistor, a control electrode coupled to the second current electrode of the fourth transistor, and a second current electrode coupled to the second power supply voltage terminal; and a third inverter having an input terminal coupled to the output terminal of the second inverter, and an output terminal coupled to the control electrode of the first transistor and not coupled to the control electrode of the clamping transistor, wherein the third inverter is configured to provide a feedback signal to the first transistor that is distinct from the trigger signal provided by the first inverter to the clamping transistor.

18. The ESD protection circuit of claim 17, wherein a ratio of channel length over channel width of the third transistor is higher than a ratio of channel length over channel width of the fourth transistor.

19. The ESD protection circuit of claim 17, wherein a ratio of channel length over channel width of the sixth transistor is less than a ratio of channel length over channel width of the fourth transistor.

20. The ESD protection circuit of claim 17, further comprising a resistive element having a first terminal coupled to the control electrode of the clamping transistor, and a second terminal coupled to the second power supply voltage terminal.

* * * * *